(12) United States Patent
Herren et al.

(10) Patent No.: US 7,167,631 B2
(45) Date of Patent: Jan. 23, 2007

(54) HIGHLY STABLE AND VERY LIGHT OPTICAL BENCH AND EXTRA TERRESTRIC USE OF SUCH AN OPTICAL BENCH

(75) Inventors: Andreas Herren, Wagenhausen (CH); Stève Mérillat, Zürich (CH); Benno Niedermann, Zürich (CH)

(73) Assignee: Contraves Space AG, Zurich (CH)

( * ) Notice: Subject to any disclaimer, the term of this patent is extended or adjusted under 35 U.S.C. 154(b) by 0 days.

(21) Appl. No.: 11/117,251

(22) Filed: Apr. 27, 2005

(65) Prior Publication Data

US 2005/0249476 A1 Nov. 10, 2005

(30) Foreign Application Priority Data

May 4, 2004 (CH) .......................... 2004 00790/04

(51) Int. Cl.
*G02B 6/00* (2006.01)
(52) U.S. Cl. ....................................... 385/147; 385/135
(58) Field of Classification Search ................ 385/135, 385/147

See application file for complete search history.

(56) References Cited

U.S. PATENT DOCUMENTS 2,839,442 A * 6/1958 Whitaker ...................... 156/213
3,912,380 A * 10/1975 Klein ............................ 359/848
3,998,024 A * 12/1976 Frandsen ...................... 52/592.1
4,353,947 A * 10/1982 Northcutt ...................... 428/116
5,424,497 A * 6/1995 Dias et al. ..................... 181/290
5,443,884 A 8/1995 Lusignea et al. .............. 428/116
2003/0082315 A1 5/2003 Mehlman et al. .......... 184/6.16

FOREIGN PATENT DOCUMENTS

EP 0 887 680 A 12/1998
EP 0 926 525 A 6/1999

OTHER PUBLICATIONS

European Search Report for EP 05 00 7592 dated May 5, 2006.

* cited by examiner

*Primary Examiner*—Ellen E. Kim
(74) *Attorney, Agent, or Firm*—McCormick, Paulding & Huber LLP

(57) ABSTRACT

Apparatus with an optical bench and at least one optical element, which is attached on the optical bench, whereby the optical bench comprises a layer structure with an extruded honeycomb plate from light alloy, paper or char-fiber-reinforced plastic. A first cover layer is glued to the honeycomb plate and comprises a first glass-like plate, which is surface-treated on that side which faces away from the honeycomb plate. A second cover layer glued to the lower surface of the light alloy honeycomb plate and comprises a second glass-like plate. The optical bench has suspensions, which glued to one or more parts of the layer structure for force introduction into the layer structure. The optical element is fixed by cold welding or glueing on the surface-treated side of the first glass-like plate.

13 Claims, 2 Drawing Sheets

HIGHLY STABLE AND VERY LIGHT OPTICAL BENCH AND EXTRA TERRESTRIC USE OF SUCH AN OPTICAL BENCH

CROSS REFERENCE TO RELATED APPLICATIONS

The priority of Swiss Patent Application 2004 00790/04 of May 4, 2004 is claimed, and the disclosure of the Swiss Patent Application is incorporated by reference.

FIELD OF THE INVENTION

The present invention concerns a stable, light optical bench and its use in space.

BACKGROUND OF THE INVENTION

Optical setups require a precise mounting platform for the placement of single optical elements, such as for instance filters, prisms, mirrors, lenses, and so forth. Typically, an optical bench serves as mounting platform for such elements.

Neither the floor space nor the weight play an important role for many applications and the corresponding materials and setups may be chosen. In more modern applications often massive glass or glass-ceramic plates are being deployed.

More and more often, however, optical setups are being moved or employed in moving systems. In this case the size and weight of the optical bench can play an important role. The weight is a decisive factor in setups that have to be accelerated or decelerated.

Today, such applications rely often on glass or glass-ceramic plates, whereby cutouts for the reduction of the weight are formed by means of milling, for example. It is an advantage of this approach that the knowledge collected in connection with apparatus based on such glass or glass-ceramic plates can be used further on. It is a disadvantage of this approach that the mass reduction due to the cutouts Is not sufficient for many applications. Moreover, the making of the cutouts is costly and may lead to waste in the production. The loss of stability is regarded to be a further disadvantage. In particular in case of setups that are dynamically loaded, or if being employed in an environment with strongly fluctuating temperatures, such as in space for instance, the cutouts cause inhomogeneities that may for example give rise to tensions. Particularly disadvantageous is the carving out of Zerodur-plates by means of milling, since during this handling step the part tend to burst due to internal tensions.

The deployment of optical setups in space is mentioned as example for applications that are particularly critical. These setups have to be able to be transported into space and there to be permanently and reliably deployed. Especially at launch of the carrier rocket that shall bring the setup into space, the costs are determined based on the weight, since per kilogram of mass to be transported an enormous amount of energy has to be made available.

Besides of the weight there are other factors for moving optical systems or optical systems that are being moved, that are important. Criteria, the adherence to which is of fundamental importance, are the (torsion-) stiffness, roughness, planarity, temperature stability, shock resistance, etc.

It is an object of the invention to provide an apparatus that avoids or reduces the disadvantages of known apparatus.

It is thus an object of the present invention to provide an optical bench that is lighter than conventional setups and that at the same time fulfils the essential criteria, which are, depending on the application and place of deployment, imposed on the system.

Furthermore, it is an object of the invention to provide an optical bench that can be deployed extra terrestrically.

SUMMARY OF THE INVENTION

According to the present invention this objective is achieved by apparatus forming an optical bench for at least one optical element and comprising a layered structure having a honeycomb plate of light metal, paper or carbon reinforced plastic, and first and second glass-type cover plates attached to opposite sides of the honeycomb plate. Suspension points are secured to the layered structure for load transmission. The outwardly facing side of one cover plate is surface treated for securing an optical element. A three point suspension can be added to connect the apparatus to a satellite.

Advantageous embodiments of the apparatus also described in the specification.

BRIEF DESCRIPTION OF THE DRAWINGS

Further characteristics and advantages of the invention will in the following be described in detail by means of the description and by making reference to the drawings.

DESCRIPTION OF THE PREFERRED EMBOPDIMENTS

Figure 1:
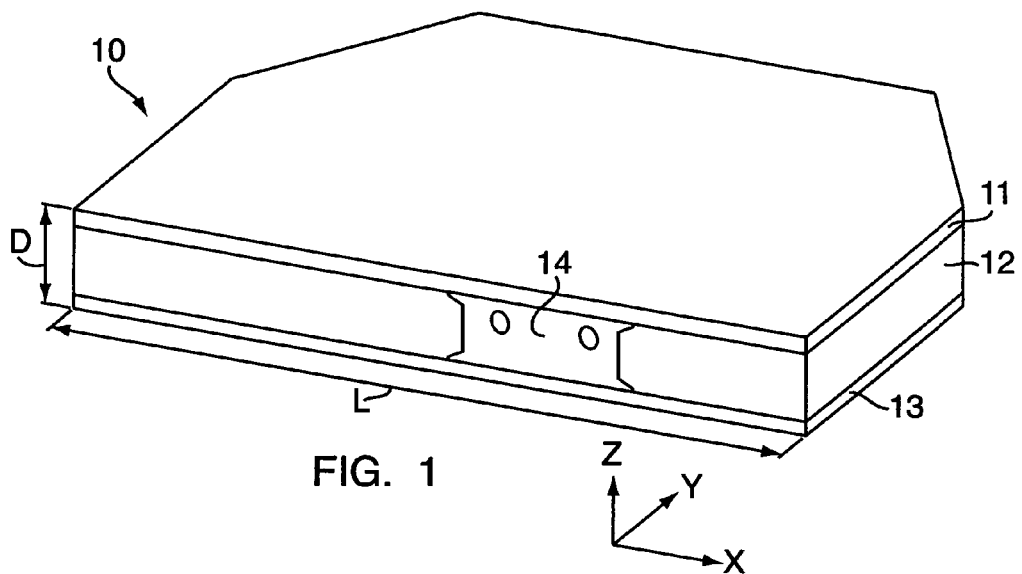
FIG. 1 shows a first optical bench, according to the present invention, in a schematical representation.

The principle of the present invention is being described in connection with a first embodiment. In FIG. 1, this first embodiment is shown by means of a first schematic view and in FIG. 2 as schematically exploded view.

A view of an optical bench 10 is shown that has, according to the invention, a layered structure. The layered structure comprises a honeycomb plate 12 with a flat upper and lower side. This honeycomb plate preferably comprises light metal (aluminum), paper (preferably Nomex® Aramid Paper), or carbon fiber enforced plastic (CFK). Preferably, the honeycomb plate is extruded. A first cover layer 11 is glued onto the honeycomb plate 12. It comprises a first glass-type plate, which is surface-treated on the side which is facing away from the honeycomb plate 12. In the example illustrated, the visible surface is surface-treated. A second cover layer 13 is glued onto the lower side of the honeycomb plate 12. It comprises a second glass-type plate which may possibly also be surface-treated. In addition, the optical bench 10 comprises suspensions 14 which are glued to one or more elements for guiding forces into the layered structure. The suspensions 14 are placed like inserts into cutouts, as can be seen in FIG. 2.

In a preferred embodiment, the suspensions are essentially only glued to the lower side of the upper cover layer 11 and the upper side of the lower cover layer 13. In this case mainly the uppers sides O and the lower sides U of the suspensions 14 are connected with the cover layers 11, 13, the respective glue connections are mainly loaded in parallel to theirs flat dimensions in the x-y plane (shear load). The guiding of forces thus occurs via large shear planes, the area dimension of which is defined by the upper and lower faces of the suspensions 14.

Figure 3:
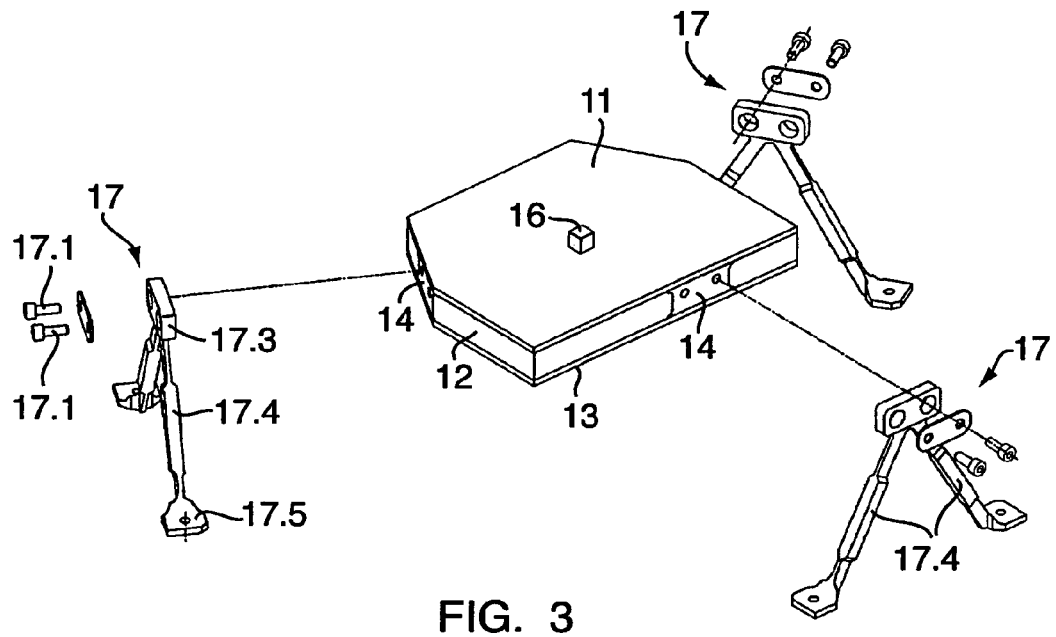
FIG. 3 shows further details of the first optical bench, according to the present invention, in a schematical representation.

Preferably, the suspensions 14 comprise holes, that can receive pins, screws 17.1 or axis, as shown in FIG. 3. It is preferred to glue these connections. In this case the holes serve for provisional screwing, respectively for the injection of glue. Depending on the application it is sufficient to use screwing only.

Figure 2:
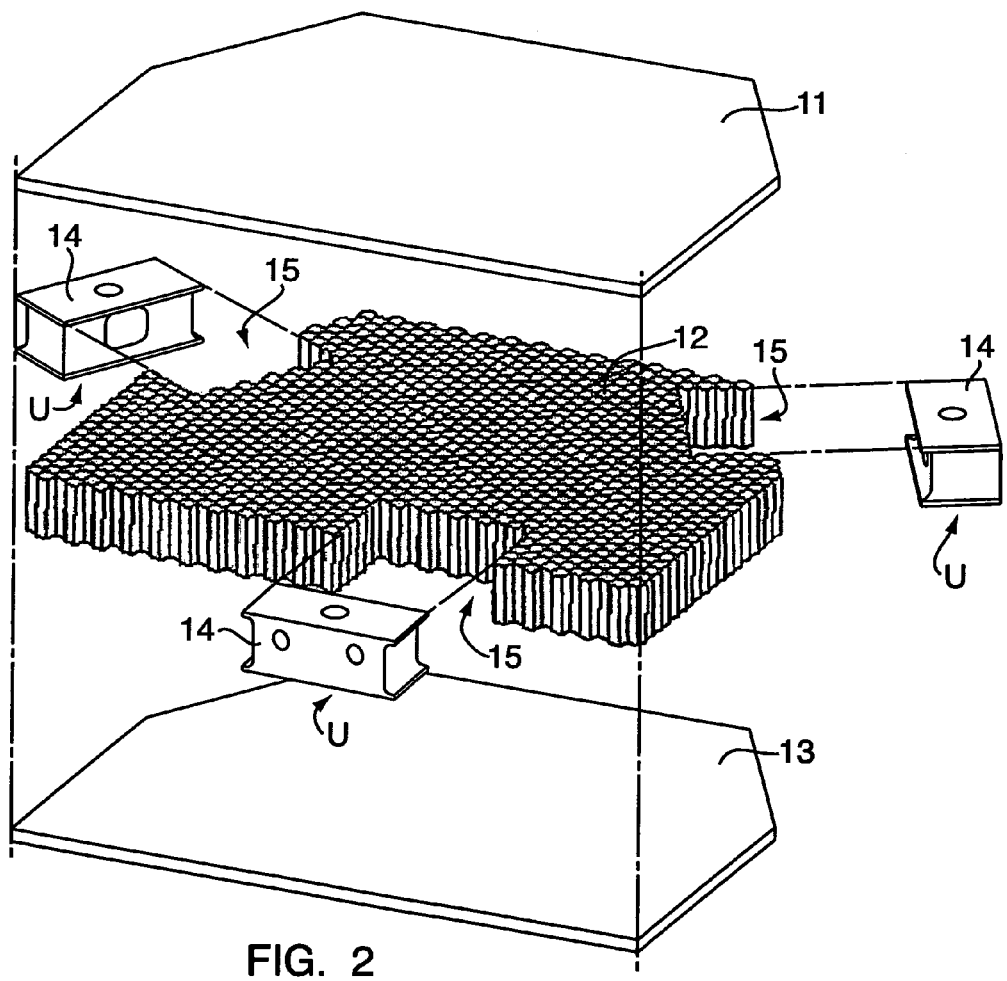
FIG. 2 shows the first optical bench, according to the present invention, in a schematical, exploded view.

The honeycomb structure of the honeycomb plate 12 is recognizable in FIG. 2. The honeycomb plate comprises a large number of single honeycomb-shaped cells that are being made from thin aluminum foils that are being extruded accordingly. The honeycomb plate 12 has flat upper and lower sides which extend perpendicular to the sidewalls and which lie in the x-y plane.

In the example shown the optical bench has a hexagon shape (if viewed from above or below) with six straight edges. It may, however, be realized in any other desired shape. The required optical stability defines the ratio between thickness D and largest length L. According to the invention this ratio is between 1/20 and 1/5. If the ratio between thickness D and largest length L is chosen taking into account these value, sufficient stability at low weight can be guaranteed for most optical applications.

In the embodiments shown, the upper and the lower cover layers 11, 13 each only comprise one glass-type plate and a glue layer each, which is not visible in the FIGS. 1 and 2. The glass-typ plates hence are glued right onto the honeycomb plate 12.

In FIG. 3 a preferred suspension, according to the present invention, of the optical bench 10 is shown. There are three so-called bipods 17 provided which together serve as 3-point suspension.

The bipods, as their name indicates, have two shanks 17.4 which terminate in foot plates 17.5. For fixing the bipods 17 on a frame or mounting platform holes may be provided in the foot plates 17.5. The bipods may also rest on another optical bench. In the area where the two shanks 17.4 meet a mounting plate 17.3 may be provided which in the example as shown comprises two through holes. A shim 17.2 may be applied and screws 17.1 may be screwed through the holes in the mounting plate 17.3 into the holes of the suspension 14. With such a suspension of the optical bench 10, in particular if glued in addition, a light and very stable 3-point bearing results. An optical element 16 is shown in FIG. 1 that is fixed on the surface-treated glass-type plate 11. The optical element 16 shown involves a reference cube. The 3-point suspension described is particularly well suited for use on a satellite.

The following optical elements, beneath others, can be fixed on the glass-type plate 11: prisms, lenses, mirrors, spacers, lambda-quarter or lambda-half wave plates, filters, lasers, etalons, optical detectors, etc. Resonators, light sources, interferrometers, transmitters, receivers, cameras and other optical systems can be realized with such optical elements.

Figure 4:
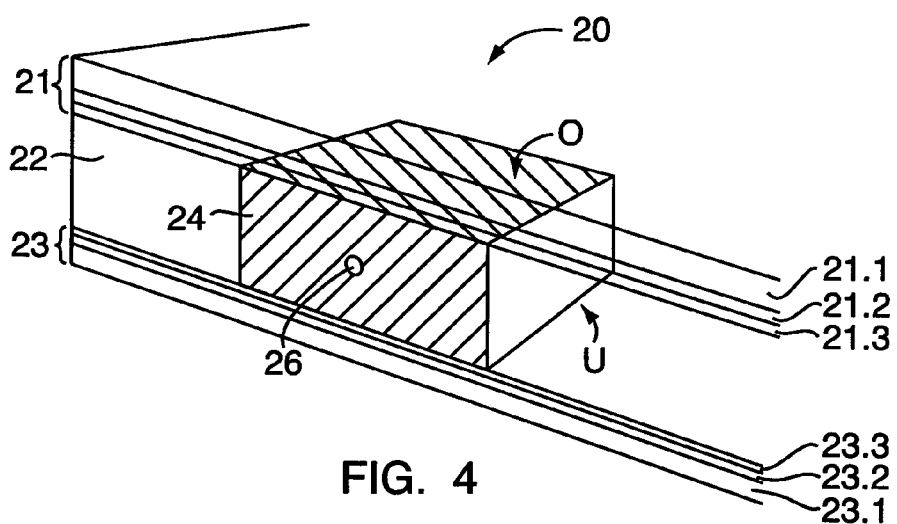
FIG. 4 shows a second optical bench, according to the present invention, in a schematical partial representation.

A further embodiment of an optical bench 20 is shown in FIG. 4 in the form of a partial view. In the embodiment shown, the upper cover layer 21 and the lower cover layer 23 of the optical bench 20 comprise a glass-type plate 21.1 and 23.1, a glue layer 21.3 and 23.3 each, and a fiber enforced layer 21.2 and 23.2 each. The glass-type plates 21.1 and 23.1 are in this case not glued directly onto the honeycomb plate 22, but separated from the honeycomb plate 22 by the fiber enforced layers (e.g., CFK) 21.2 and 23.2 and the glue layers 21.3 and 23.3. This has the advantage that, if necessary, the stiffness per unit of weight can be further increased significantly. A suspension 24 is shown, the upper surface O (in hatched representation) of which is glued to the lower side of the glue layer 21.3 and its lower surface U (not shown) is glued to the upper side of the glue layer 23.3. The suspension 24 shows a hole 26 on the front side presented in gray which can receive a pin, a screw or an axis. Due to this a suspension similar to the one shown in FIG. 3 can be employed.

According to the present invention at least one optical element is fixed on the surface-treated side of the first glass-type plate by means of contacting or glueing. No optical element is shown in the FIGS. 1 and 2 since in these Figures only the setup of the optical bench 10 is shown as a first embodiment. In FIG. 3 one optical element is illustrated as example.

During optical contacting the optical element is "exploded on". A mechanical bond develops due to adhesion forces between the optical element and the surface-treated, glass-type plate. Preferably, the surface of the glass-type plate and one side of the optical element to be fixed are polished so even that both adhere to each other because of atomic adhesion. It is important that the connection is so well that the element cannot break loose. In a special optional embodiment the connection is at least in a certain wavelength range transparent to avoid losses. Preferably, the exploding on is carried out in a clean room. Especially preferred is a clean room of class 100 or better.

The optical elements are, according to the present invention, either fixed by means of optical contacting, as described in the last section, or they are fixed by means of silicate glue (hydro-catalytic bonding). Both methods have in common that the connection practically occurs directly. In case of optical contacting the thickness is zero, in case of silicate glueing a few through 100 nanometers. Naturally, the parts can also be glued the normal way with glue thickness of some micrometers.

Preferably, each of the glass-type plates has a thickness between 0.5 and about 5 millimeters. Especially preferred is a plate thickness of about 2.5 to 3.5 millimeters.

The honeycombs of the honeycomb structure preferably have a cell size from 2 to 8 millimeters and a hexagonally arranged construction.

It is an advantage of the invention that the mass as compared to conventional setups can be reduced by up to 60% and more without disregarding the most important criteria of the optical bench.

Preferably, the glass-type plates are Zerodur (Schott Glass Technologies; Duryea, Pa.), ULE (Corning Inc.; Corning, N.Y.), or quarz glass (fused silica). Zerodur is a ceramic glass with an extremely small expansion coefficient and ULE is a titanium silicate with extremely small expansion coefficient. Especially preferred is a symmetrical setup that on the upper and lower side comprises an identical glass-type plate. Thermal tensions can be reduced due to this. Any deviation from the symmetrical layered setup can lead to tensions like in a bi-metal. This, however, does not exclude that the two cover plate have different thicknesses.

An optical bench according to the invention allows a much better guiding of forces. Due to this the field of use is much larger. Dynamical loads can be better absorbed due to the special way how the forces are guided without causing damage to the optical bench or its elements. Temperature fluctuations can be better absorbed without causing problems.

During the production no time- and cost consuming treatment of glass plates or glass-ceramic plates has to be carried out. More or less, conventionally available plates can be used. Due to this the total costs can be reduced and the waste can be kept small.

It is an advantage of the invention that simple glass-type plates can be used that are more stable since they do not have any cutouts.

Preferably the cover layers are connected to the honeycomb structure in a vacuum. Well suited for the deployment in space are honeycomb plates with walls comprising holes thus enabling a pressure relief. Preferred are honeycomb plates with perforated walls.

It is an advantage of the invention that the cover layer can be adapted to the actual application. According to the invention accuracies if the range of nanometers can be achieved. Preferably the roughness of a surface-treated glass-type plate amounts to less than 10 nanometers and preferably less than 5 nanometers. The flatness across the whole dimension is between 10 and 200 nanometers and preferably between 20 and 50 nanometers.

The honeycomb structure 12 has the advantage that it is relatively soft in the x-y plane. Due to the fact that the upper side as well as the lower side is glued with the respective cover layers 11 and 13, respectively, no remarkable thermal movements occur in the x-y plane. In z-direction, however, the layered structure may work freely. At increasing temperatures the honeycomb structure expands in equal parts up and down. Since the two cover layers are independent from another the whole layered structure may work in z-direction.

The honeycomb structure is built from light metal walls and has a high thermal conductivity. Temperature gradients are evened out quickly without local tensions to occur that could cause a tensioning of the cover layers. Especially preferred are aluminum honeycomb structures since aluminum is highly conductive.

During the assembly of the optical bench 10 according to the invention the layers of the layered structure are glued to each other first. In doing so preferably an epoxy glueing film is employed that hardens at increased temperatures. The glueing film is applied onto the honeycomb structure and the cover layers are applied. Then the hardening of the glueing film is initiated by heating, for instance in an oven. Only after the hardening the suspensions 14 are provided on the upper and lower sides (O, U) with a suited glue and put into the cutouts 15. Due to this step-wise assembly tensions can be excluded.

In further steps the optical elements are optically contacted or glued on. Prior to this the surfaces of the glass-type plate are treated, for instance to remove grease remainders. The optical elements are being optically contacted or glued on in a clean room, as already mentioned.

Preferably the optical bench and its suspension is realized so that it is suited for transportation into space that typically is done by means of a rocket and is connected with high static loads and vibrations. Finally, the optical elements have to be fixed on the optical bench so that the large temperature differences and the steep temperature gradients caused by these temperature differences have no negative influence on the total system.

Preferably the optical bench with the optical elements is employed as part of an optical telescope that is designed for the communication between satellites (intersatellite communication) or for the communication between a terrestric appliance and a satellite. The optical bench may also be part of a spectrometer.

The invention claimed is:

1. Apparatus with an optical bench and at least one optical element which is attached to the optical bench, whereby the optical bench comprises a layered structure, with
   an extruded honeycomb plate formed from light metal, paper or carbon reinforced plastic with an upper and a lower side, the honeycomb plate defining a cutout for receiving a suspension therein,
   a first cover layer being glued to the upper side of the honeycomb plate and comprising a first glass-type plate including a treated surface on the one side that faces away from the honeycomb plate,
   a second cover layer being glued to the lower side of the honeycomb plate and comprising a second glass-type plate,
   a suspension disposed in said cutout and glued to one or more parts of the layered structure for guiding forces, and the optical element being attached to the surface-treated side of the first glass-type plate by means of optical contacting or glueing.

2. Apparatus according to claim 1, characterized in that the first glass-type plate and/or the second glass-type plate comprises glass or a glass-ceramic, preferably Zerodur, UVM, or a guartz glass.

3. Apparatus according to claim 1, characterized in that the honeycomb plate comprises aluminum, paper or CFK, whereby the walls of the honeycomb plate have holes, preferably in the form of perforations.

4. Apparatus according to claim 1, characterized in that the first cover layer comprises an intermediate layer in addition to the first glass-type plate, which is situated between the honeycomb plate and the first glass-type plate and which preferably comprises a fiber enforced material.

5. Apparatus according to claim 1, characterized in that the treated surface of the first glass-type plate includes a polished surface providing an optically functional surface for attaching the optical element.

6. Apparatus according to claim 1, characterized in that the suspensions are realized and arranged so that the guiding of forces into the layered structure takes place at least at three locations at the circumferential area of the layered structure.

7. Apparatus according to claim 1, characterized in that the suspensions are glued by a glue film into the layered structure so that the glueing connections between the suspensions and the layered structure are mainly subjected to tension and/or shear.

8. Apparatus according to claim 1, characterized in that the first glass-type plate consists of the same material as the optical element.

9. Apparatus according to claim 1, characterized in that a glue film is applied for the glueing of the cover layers which preferably hardens with temperature.

10. Apparatus according to claim 9 characterized in that the glue film is an epoxy glue film.

11. An apparatus according to claim 1 for use in a satellite, further including a 3-point suspension.

12. Apparatus according to claim 11, characterized in that the 3-point suspension comprises bipods.

13. Apparatus according to claim 1 characterized in that the second glass type plate is also surface treated on the side facing away from the honeycomb plate.

* * * * *